(12) United States Patent
Kobayashi et al.

(10) Patent No.: US 7,973,940 B2
(45) Date of Patent: Jul. 5, 2011

(54) OPTICAL OBJECT MEASUREMENT APPARATUS

(75) Inventors: Koji Kobayashi, Chofu (JP); Naoki Kobayashi, Chofu (JP)

(73) Assignee: Kowa Company Ltd. (JP)

( * ) Notice: Subject to any disclaimer, the term of this patent is extended or adjusted under 35 U.S.C. 154(b) by 256 days.

(21) Appl. No.: 12/316,358

(22) Filed: Dec. 11, 2008

(65) Prior Publication Data

US 2010/0149546 A1      Jun. 17, 2010

(51) Int. Cl.
*G01B 11/02* (2006.01)
(52) U.S. Cl. ...................................................... 356/497
(58) Field of Classification Search .................. 356/497, 356/511
See application file for complete search history.

(56) References Cited

U.S. PATENT DOCUMENTS

| 4,802,748 | A | * | 2/1989 | McCarthy et al. | 359/368 |
| 5,067,805 | A | * | 11/1991 | Corle et al. | 359/235 |
| 7,133,138 | B2 | * | 11/2006 | Horii et al. | 356/497 |
| 2006/0082781 | A1 | * | 4/2006 | Chan et al. | 356/495 |
| 2008/0144006 | A1 | * | 6/2008 | Stelzl et al. | 356/51 |

FOREIGN PATENT DOCUMENTS

JP          06242380 A   *  9/1994

* cited by examiner

*Primary Examiner* — Michael A Lyons
(74) *Attorney, Agent, or Firm* — Adams & Wilks (57) ABSTRACT

An optical object measurement apparatus includes a light source for generating a low-coherent light beam, which is swept via an array of pinholes on a Nipkow disk that rotates about an axis. A beam splitter splits the swept light beam into a probe light beam toward an object to be measured and a reference light beam toward a reference optical path. The probe light beam from the object and the reference light that has traveled along the reference optical path are combined in the beam splitter to produce interference light. A two-dimensional image-capturing device detects the interference light and produces a video signal to provide reflection intensity information of the interior of the object. This allows an interference optical system to be readily realized and tomographic images of an object to be observed at high levels of resolution and contrast.

4 Claims, 5 Drawing Sheets

OPTICAL OBJECT MEASUREMENT APPARATUS

BACKGROUND OF THE INVENTION

1. Field of the Invention

The present invention relates to an optical object measurement apparatus, and in particular relates to an optical object measurement apparatus wherein a predetermined area of an object to be measured is irradiated with a light beam from a light source, and optical interference is used to detect light reflected from the object in order to derive therefrom tomographic information of the object.

2. Description of the Prior Art

Several apparatuses have been known for using a laser light source or another light source to observe a shape of a three-dimensional surface of an object or tomographic information of an interior of a sample. For example, it is known that a confocal optical microscope can improve resolution in the depth direction better than a normal optical microscope, and allow the shape and structure of a surface of a microscopic sample surface to be observed and measured.

Document D1, Japanese Laid-open PCT Publication No. 1989-503493, discloses an optical object measurement apparatus as an example of one technique in a confocal optical system, wherein a sample is irradiated with a light beam emitted from a laser light source via a rotating disk having a pinhole array, and light reflected from the sample again passes through the rotating disk and is detected.

Document D2, Japanese Laid-open Patent Publication No. 1994-242380 (U.S. Pat. No. 3,294,246), discloses a configuration in which a sample is scanned using a light beam from a laser light source passing through a pinhole disk, and interference light that is formed from light reflected from the sample and reference light from a reference mirror is detected. It is suggested in Document 2 that adjusting a distance between the sample to be measured and an objective lens allows a three-dimensional shape of a surface of the sample to be accurately measured from a position at which an interference signal reaches maximum light intensity.

Meanwhile, optical coherence topography (OCT) apparatuses involving the use of interference from a low-coherent light (partially coherent light) have been receiving attention over the past several years. The OCT makes it possible to examine and observe predetermined tomographic images of an object to be measured in a contactless and noninvasive manner, and are starting to be applied as scanning devices in medicinal, biological, and industrial fields.

For example, Document D3, Japanese Laid-open Patent Publication No. 1992-174345 (Japanese Examined Patent Application (Kokoku) No. 1994-35946), discloses an example of early OCT wherein means is provided for generating a frequency-shifted reference light beam from an irradiation light beam, and a light beam reflected from an object to be measured is combined with the reference light beam to produce a beat component, which is detected to provide an tomographic image of the object.

Document D4, Japanese Laid-open PCT publication No. 1994-511312 (U.S. Pat. No. 3,479,069), discloses a configuration of OCT comprising a light source having short coherence length characteristics, an interferometer having an optical fiber, phase modulation means, a transverse-direction scanning mechanism, an ultrasonic light modulator, means for controlling an optical path length, and the like. Document D4 discloses a basic technique wherein interference light guided via an optical fiber is detected and processed to efficiently obtain a tomographic image of the sample with the aid of a confocal effect due to the optical fiber.

Document D5, Japanese Laid-open Patent Publication No. 2000-126188 (U.S. Pat. No. 3,318,295), discloses an optical tomography observation apparatus including a light source for generating low-coherent light and an optical fiber interferometer. The apparatus is usefully combined with a structure constituting an end part of an endoscope, body cavity scope, or other instrument via one optical path of the interferometer. Document D5 discloses a technique involving the use of the endoscope or other instrument inserted into a body cavity, wherein a CCD or other device provided as a conventional observation device is used to provide a two-dimensional reflected image of a diseased tissue and a tomographic image in the depth direction thereof that is obtained by detecting an interference signal from an interferometer.

Document D6, Japanese Laid-open Patent Publication No. 1998-332329 (U.S. Pat. No. 3,332,802), discloses a configuration that employs a semiconductor laser light source with a beam frequency capable of being swept, a Michelson interferometer, and a one- or two-dimensional image-capturing device. A video signal that is output in the frequency sweeping period is subjected to Fourier transformation to produce a tomographic image. Such a system is advantageous in that a sweeping mechanism for performing a mechanical movement in the optical axis direction is not additionally required, a stable interference optical system can be established, and measurements can be obtained in a short amount of time.

Document D7, Japanese Laid-open Patent Publication No. 1999-325849, discloses a configuration wherein a light beam is split into a reference arm and a measuring arm, and a spectrograph is used to detect the intensity of light that is produced by interference between a measuring beam obtained via the measuring arm and a reference beam obtained through the reference arm. The reference arm is provided with means for changing the phase of the light, and a signal from the spectrograph is analyzed to produce an optical tomographic image of a transparent, partly transparent, or opaque object.

Document D8, Japanese Laid-open Patent Publication No. 2001-330558 (U.S. Pat. No. 3,594,875), discloses a system wherein a light beam from a light source is split into a signal optical path that passes through an object to be measured and a reference optical path that travels via a predetermined reflecting mirror, and an interference optical system is provided with two CCD sensors for receiving a periodically isolated interference beam that is split into two. The two CCD sensors receive interference light pulses that have different phases and produce signals, which are processed to provide image information of an interior layer of the object.

Document D9, Japanese Laid-open Patent Publication No. 2005-241464, discloses a system wherein a light beam from a light source is split into a signal optical path that passes through an object to be measured and a reference optical path that travels via a predetermined reflecting mirror, and an interference optical system is provided with three CCD sensors for receiving an interference beam that is split into three. The three CCD sensors receive interference light pulses that have different phases and produce signals, which are processed to provide image information of an interior layer of the object.

Document D10, Japanese Laid-open Patent Publication No. 2005-245740, discloses an OCT apparatus with an interferometer comprising means for forming a plurality of interference images differing in phase, and means for extracting the plurality of interference images by high-speed switching. The plurality of extracted interference images are detected using CCD image sensors, and the plurality of detected images is processed to form a tomographic image.

However, an interferometer is not used in Document D1. Therefore, the apparatus in Document D1 cannot be used to observe the interior of a sample, as is done with OCT or another form of tomography. By contrast, an interferometer is used in Document D2. However, a low-coherence property of the light source is not used. Additionally, background light associated with scattering in the interior of the sample is not removed. For these and other reasons, the apparatus cannot be used for tomographic observation or measurements of the interior of a sample such as with OCT.

Documents D3 through D5 disclose basic OCT systems ("time-domain method"), in which a reflecting mirror associated with a reference beam is controlled to move in the optical axis direction to scan the object in the depth direction thereof. Therefore, the focus of the irradiation light directed on the object to be observed cannot be optimally maintained for the entire region of the tomographic image, and complications are encountered in achieving higher levels of resolution in the in-plane direction orthogonal to the optical axis (depth direction).

Document D6 discloses an OCT system called "swept source method" in which a light source with a light wavelength swept is used. Problems are presented with this system in that a specialized type of laser light source that can stably control the frequency of the light over a desired range is required; a light source of this type is limited in terms of variety, wavelength range, and other aspects; and the light source itself is expensive.

Document D7 discloses an OCT system called "spectral-domain method" in which a detector in the form of a spectrograph is used in the detection system. Advantages of this system are that the tomographic information is extracted based on numeric calculations, making mechanical scanning in the depth direction unnecessary; however, problems are presented in that the characteristics of the spectrograph limit the measurement range in the depth direction, and resolution is not readily improved in the direction orthogonal to the depth direction.

Documents D8 through D10 disclose novel OCT systems in which a two-dimensional image-capturing device is used in the detector. Problems are presented with this system in that when an image is captured of a living organism or other object having a strong scatter factor, the presence of strong background light superimposed as a direct-current component on the detector causes saturation in the image-capturing device, and makes it difficult to improve the gradation of a signal component that contains tomographic information. Problems are also presented in that it is difficult to maintain precise alignment between the two CCDs in Document D8, and the three CCDs in Document 9. Furthermore, drawbacks are presented in Document D10 in that the light source is not used efficiently, and a high-cost, specialized switching light source or other such configuration is necessary when the system is implemented in practice.

It is therefore an object of the invention to provide a highly practical, simpler and less expensive optical object measurement apparatus capable of observing a tomographic image of an object with high levels of resolution and contrast and capable of being applied for measurement thereof.

SUMMARY OF THE INVENTION

The present invention relates to an optical object measurement apparatus in which a predetermined area of an object to be measured is irradiated with a light beam from a light source, and optical interference is used to detect light reflected from the object in order to derive therefrom tomographic information of the object. The apparatus comprises a light source for generating a low-coherent light beam; pinhole means disposed in a plane through which the light beam passes for sweeping the light beam from the light source; a beam splitting element for splitting the light beam that has passed through the pinhole means into a probe light beam toward the object and a reference light beam toward a reference optical path; two-dimensional image-capturing means for detecting an interference light beam that is produced by interference between the probe light beam from the object that has been guided via the beam splitting element and the reference light beam that has passed through the reference optical path; and signal processing means for processing a video signal output from the two-dimensional image-capturing means to derive therefrom reflection intensity information of an interior of the object.

An optical object measurement apparatus according to the present invention also comprises a light source for generating a low-coherent light beam; pinhole means disposed in a plane through which the light beam passes for sweeping the light beam from the light source; a beam splitting element for splitting the light beam that has passed through the pinhole means into a probe light beam toward the object and a reference light beam toward a reference optical path; light modulating means for modulating the reference light beam such that the phase thereof periodically shifts in the reference optical path; two-dimensional image-capturing means for detecting an interference light beam that is produced by interference between the probe light beam from the object that has been guided via the beam splitting element and the reference light beam that has been modulated by the light modulating means; and signal processing means for processing a video signal from the two-dimensional image-capturing means to extract phase information of the interference light beam dependent on light modulation by the light modulation means and derive therefrom reflection intensity information of an interior of the object.

Furthermore, an optical object measurement apparatus according to the present invention comprises a light source for generating a low-coherent light beam; pinhole means disposed in a plane through which the light beam passes for sweeping the light beam from the light source; a beam splitting element for splitting the light beam that has passed through the pinhole means into a probe light beam toward the object and a reference light beam toward a reference optical path; light modulating means for modulating the reference light beam such that the phase thereof periodically shifts in the reference optical path; optical means for again guiding through the pinhole means an interference light beam that is produced by interference between the probe light beam from the object that has been guided via the beam splitting element and the reference light beam that has been modulated by the light modulating means; two-dimensional image-capturing means for detecting the interference light beam that has passed through the pinhole means; and signal processing means for processing a video signal from the two-dimensional image-capturing means to extract phase information of the interference light beam dependent on light modulation by the light modulation means and derive therefrom reflection intensity information of an interior of the object.

The apparatus of the present invention employs means for sweeping a light beam via a Nipkow disk and two-dimensional image-capturing means for detecting interference light. This enables the interference optical system to be accordingly simplified, and electronic controls and processing of a detected signal to be facilitated. Particularly, as compared with a system using a galvano mirror, the Nipkow-disk-type light beam sweeping only needs a simple and linear optical path arrangement that obviates the need for light to be passed back in the optical system. This makes it possible to reduce time needed to make adjustments; and, since disk components can be manufactured inexpensively in bulk, makes it possible to reduce the cost of the entire apparatus.

The apparatus of the present invention also makes it possible to combine the effect of a confocal optical system and the effect of a low-coherence interferometer, while also yielding a tomographic image (cross-sectional image orthogonal to the optical axis) that has a high resolution, low background noise, and high levels of contrast and gradation properties based on the output image of the image-capturing device. Using these characteristics, a plurality of sectional images is collected by moving the measurement sample or the reference mirror in the depth direction, and image processing is performed to form three-dimensional image information (3D images) of the interior of the object.

Furthermore, if the two-dimensional image-capturing device is changed to a high-accuracy, high-sensitivity, and high-speed device, the optical object measurement apparatus can be readily upgraded in the future, making it possible to obtain a highly practical and economical apparatus.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the attached drawings.

Figure 1:
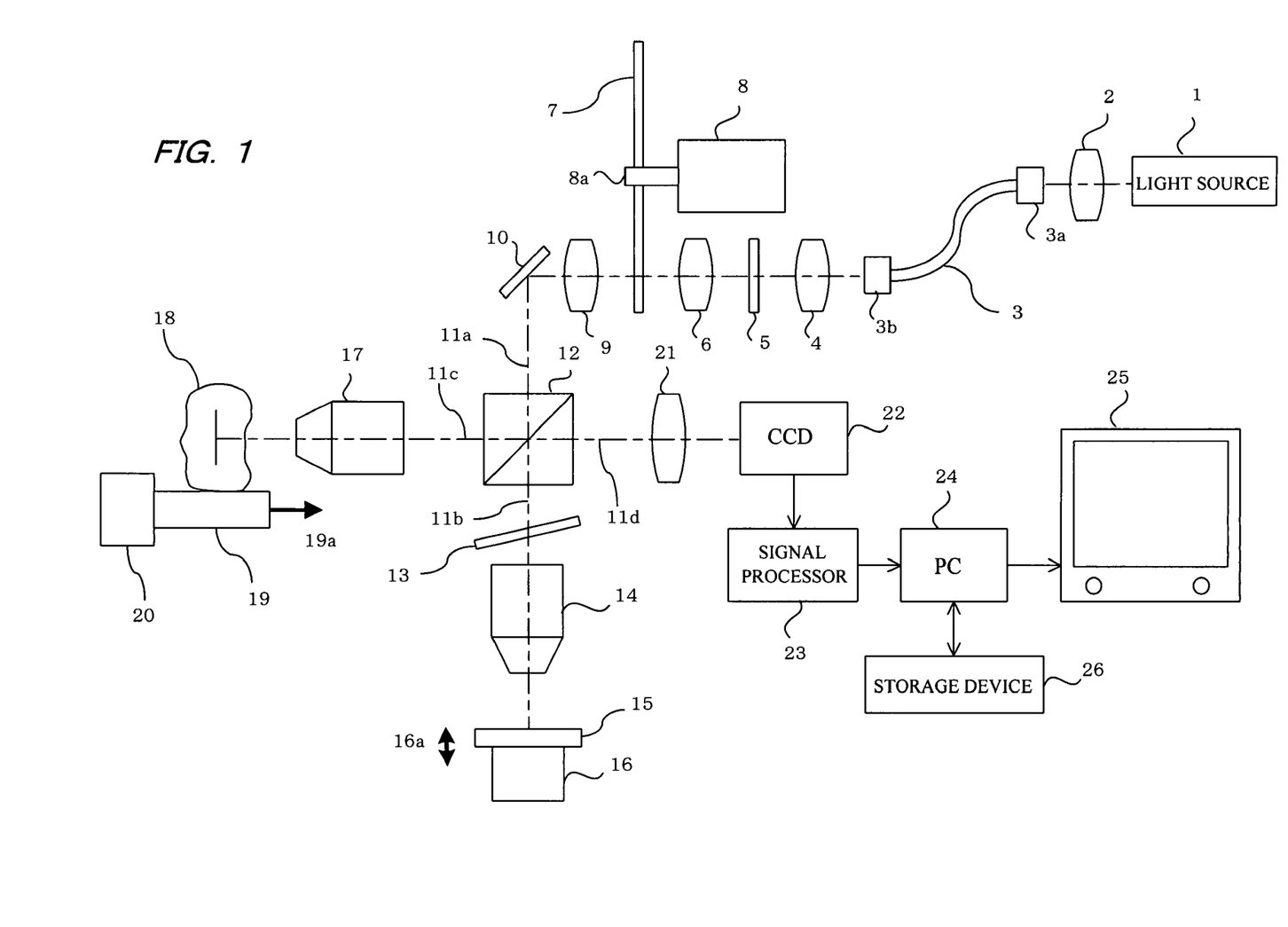
FIG. 1 is a block diagram showing an optical system in one embodiment of an optical object measurement apparatus according to the present invention.

In FIG. 1, a light source 1 is comprised of a xenon lamp or an incandescent light source such as a halogen lamp that generates infrared light of a high brightness and wide spectrum, or a super luminescent diode (SLD) or other semiconductor light source that generates light of a high brightness. The light source 1 has a necessary low-coherent property (little coherence) needed for viewing a tomographic image. A light beam from the light source 1 impinges on an incidence surface 3a of an optical fiber 3 via a lens 2. The optical fiber 3 is, for example, a multimode optical fiber provided with a core system measuring approximately several hundred microns to a several millimeters in size.

The light beam transmitted through the optical fiber 3 exits an end surface 3b of the optical fiber 3, and passes through a lens 4, a stop 5, and a lens 6 before impinging on a surface of a Nipkow disk 7. The illumination optical system leading to the Nipkow disk 7 via the lenses and the stop is designed so that the brightness in the illumination region is uniform; for example, in a Kohler illumination format.

The Nipkow disk 7, which constitutes pinhole means for sweeping a light beam, has minute pinholes whose diameters measure from approximately several tens of microns to one hundred microns. These pinholes are present in an amount of approximately ten to twenty thousand in total, and are provided in a predetermined array and spaced several hundred microns apart on a predetermined area of a metal disk composed of stainless steel thin plate. The Nipkow disk 7 is disposed in a plane through which the light beam from the light source 1 passes and which is conjugate with the measurement surface of an object 18 to be measured. The Nipkow disk 7 is connected to a motor 8 via a rotating shaft 8a, and rotates at a predetermined speed. The Nipkow disk 7 (rotating disk) sweeps the light beam emitted from the light source 1 depending upon its rotation and pinhole array. The Nipkow disk 7 through which the light beam from the light source 1 passes can improve spatial coherence.

The light beam that has passed through the Nipkow disk 7 passes through a lens 9, is reflected by a mirror 10 and enters a beam splitter 12 (BS) that functions as a beam splitting element. At the location of the beam splitter 12, the optical path includes four paths; namely, an optical path 11a on the light source side, a reference optical path 11b, a probe optical path 11c, and a detection optical path 11d.

The light beam traveling along the reference optical path 11b passes through an ND filter 13 and a lens 14, and reaches a planar mirror 15 that is orthogonal to the optical path to reflect the light beam. The mirror 15 is mounted on a piezoelectric element 16 (piezoelectric vibrator). The vibrator causes the mirror 15 to move in the optical axis direction (the direction of an arrow 16a) at a low frequency of, e.g., 60 Hz, to perform phase shifting of the light beam. The flat mirror 15 and the piezoelectric vibrator 16 thus constitute light modulating means for modulating the reference light beam so that its phase periodically shifts on the reference optical path. The optical path 11b of the reference light beam must be of the same length as the probe optical path 11c, and the distance from the beam splitter 12 to the reference mirror 15 is suitably set as necessary so that the lengths of the reference optical path 11b and the probe optical path 11c will be the same.

On the other hand, the light beam traveling along the probe optical path 11c passes through a lens 17 and forms an image on a predetermined area of the measurement object 18. The measurement object 18 is disposed on a stage 19, and the action of a stepper motor 20 enables the stage 19 to move in the optical axis direction as shown by arrow 19a. Specifically, the stage 19 and the motor 20 are used to perform scanning in the depth direction of the sample to be measured. The movement of the stage 19 in the optical axis direction allows the length of the probe optical path 11c to be changed, and enables three-dimensional tomographic image information of the measurement object 18 to be obtained.

In the embodiment shown in FIG. 1, any object may be used as the measurement object 18 provided that the object is extracted living tissue or another biological sample, food, a plant sample, an industrial component having polymeric properties, or another article that is light-permeable to some extent The light beam reflected from the measurement object 18 passes through the beam splitter 12 via a lens 17, mixes with the reference light beam returning via the reference optical path 11b, and produces interference light in the detection optical path 11d. The interference light passes through a lens 21 as a detection beam and forms an image on an image-forming surface of a two-dimensional image-capturing device 22 (CCD camera or other two-dimensional image-capturing means).

The video signal from the two-dimensional image-capturing device 22 is supplied to a signal processor 23. The signal processor 23 has a logarithmic video signal amplification circuit, a filter circuit, an A/D converter, and other computation circuits of a variety of types. A signal that has been processed and generated in the signal processor 23 is output to a computer 24 (PC).

The PC 24 controls the overall activity of the optical system, and can perform additional processing on a video signal obtained via the image-capturing device 22 and the signal processor 23. The signal processor 23 and/or the PC 24 constitutes signal processing means for processing a video signal output from the two-dimensional image-capturing device to derive therefrom reflection intensity information of an interior of the object or tomographic image information thereof.

The reflection intensity information or the tomographic image is transmitted to and displayed on a liquid crystal television monitor or other display device 25 via the PC 24, and, as necessary, a control can be performed for, e.g., transferring the data to a storage device 26 to store the data therein.

Figure 2:
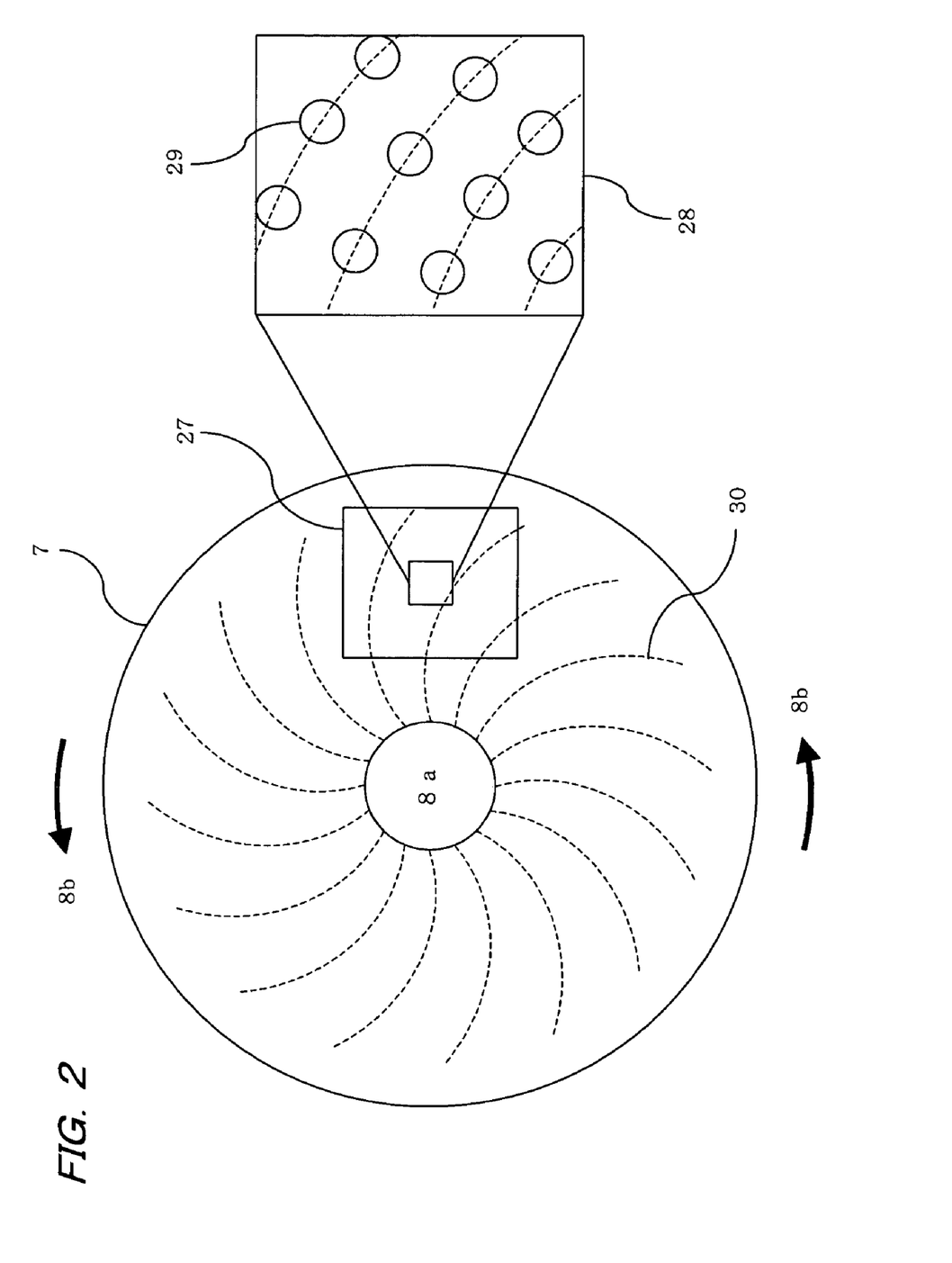
FIG. 2 is an illustrative view showing the configuration of a Nipkow disk used in FIG. 1.

FIG. 2 is an illustrative view showing the structure of the Nipkow disk 7 used in the system shown in FIG. 1. The Nipkow disk 7 can rotate in a predetermined direction (direction shown by arrow 8b) at a predetermined speed around the rotating shaft 8a of the motor 8. An enlargement of, e.g., a part of a region 27 through which the light beam passes and which corresponds to the observation range shows that very small holes (pinholes) 29 of predetermined size are provided in an array, as shown in region 28. The pinholes 29 on the disk are worked to a diameter measuring several tens of microns to one hundred microns. Approximately ten thousand to twenty thousand pinholes are formed in total at a spacing of several hundred microns.

The pinholes are photo-etched or otherwise formed in a predetermined metal plate, and such working can be performed inexpensively in a mass-production environment. It is well known in the art that the pinholes can be arranged in a fixed-pitch array 30 of spiral arms to minimize irregularities in illumination and scanning.

In an optical system such as the one shown in FIG. 1, the light beam from the light source 1 passes through the Nipkow disk 7, which sweeps the light beam over an observation surface of the measurement object 18 in accordance with its rotation and the array of pinholes 29 thereon. The pinholes 29 have the effect of making it possible to improve spatial coherence. Specifically, in the optical system of FIG. 1, the light beam is guided through the Nipkow disk 7. This improves the visibility of interference fringes observed by the image-capturing device 22 as compared with when the light beam is not guided through the Nipkow disk. As a result, an interference signal that serves as the basis of the tomographic information can be detected in a more efficient manner.

When living tissue, biological samples, and other objects of human origin that have strong diffusion properties are observed, a direct-current (DC component) superimposed as background light often causes the contrast of the detected interference fringe to decrease and the signal component (AC component) of the tomographic image to be smaller than a DC component by an order of magnitude. The effect of the DC component can be eliminated by performing a calculation between adjoining frames in a video signal from the two-dimensional image-capturing device 22. Specifically, subtraction is performed between adjoining frame images that have been obtained from the image-capturing device in order to remove the unnecessary DC component and extract an AC component representative of reflection intensity information from the interior of the object.

The above concept is described below in a more readily understandable manner using a simple numerical system. For example, a signal of the interference fringe detected in frame images that are continuously output (three frames are used as an example) in the two-dimensional image-capturing device 22 (see FIG. 1) can be conveniently described in the manner below.

$$I_{F-1}=I_D+I_A(-\sin \alpha)$$

$$I_F=I_D+I_A(\cos \alpha)$$

$$I_{F+1}=I_D+I_A(\sin \alpha)$$

$I_{F-1}$, $I_F$, $I_{F+1}$ represent the signal intensities of the representative pixels in each of the adjoining frames, respectively; $I_D$ represents a direct-current component; $I_A$ represents an alternating-current component (signal component of the tomographic image); and $\alpha$ represents the phase of the interference fringe. In the above formula, the phase difference of the interference fringe between the adjoining frames is presumed to be 90°. This condition can be locally achieved in the image space by appropriately setting the drive waveform of the light modulating means in accordance with the scanning speed of the depth scanning means.

In an actual measuring system, it is common for $I_D \gg I_A$; i.e., the direct-current component to be predominantly larger than the signal component to be determined. Therefore, as an example, a calculation such as the one below is performed.

$$(I_F-I_{F-1})^2=I_A^2(1+2\cos\alpha\times\sin\alpha)$$

$$(I_{F+1}-I_F)^2=I_A^2(1-2\cos\alpha\times\sin\alpha)$$

Therefore, $$(I_F-I_{F-1})^2+(I_{F+1}-I_F)^2=2I_A^2$$

Specifically, performing subtraction between frames allows the unnecessary DC component to be reliably removed. Furthermore, if a simple computation involving an addition, subtraction, and multiplicative calculation is carried out in relation to the three frame images, an associated phase term can also be eliminated.

Such computations enable the necessary AC component (signal component) to be readily extracted. In particular, the coherence-improving effect achieved when the Nipkow disk is used allows signals of the interference fringe to be produced at a higher contrast from the image-capturing device than when the Nipkow disk is not used. An advantage is presented in that tomographic information obtained as a computation result will be more accurate.

The above computations, including subtraction between frames, can be executed in practice in the signal processor 23 shown in FIG. 1 in a straightforward and highly accurate manner by using digital memory, a subtraction circuit, and the like after the video signal has been subjected to A/D conversion. After such digital processing, a circuit for further DSP signal processing is used to perform more complex computations in order to make further improvements in noise reduction and image quality and more readily extract reflection intensity information of the interior of the object.

Figure 3:
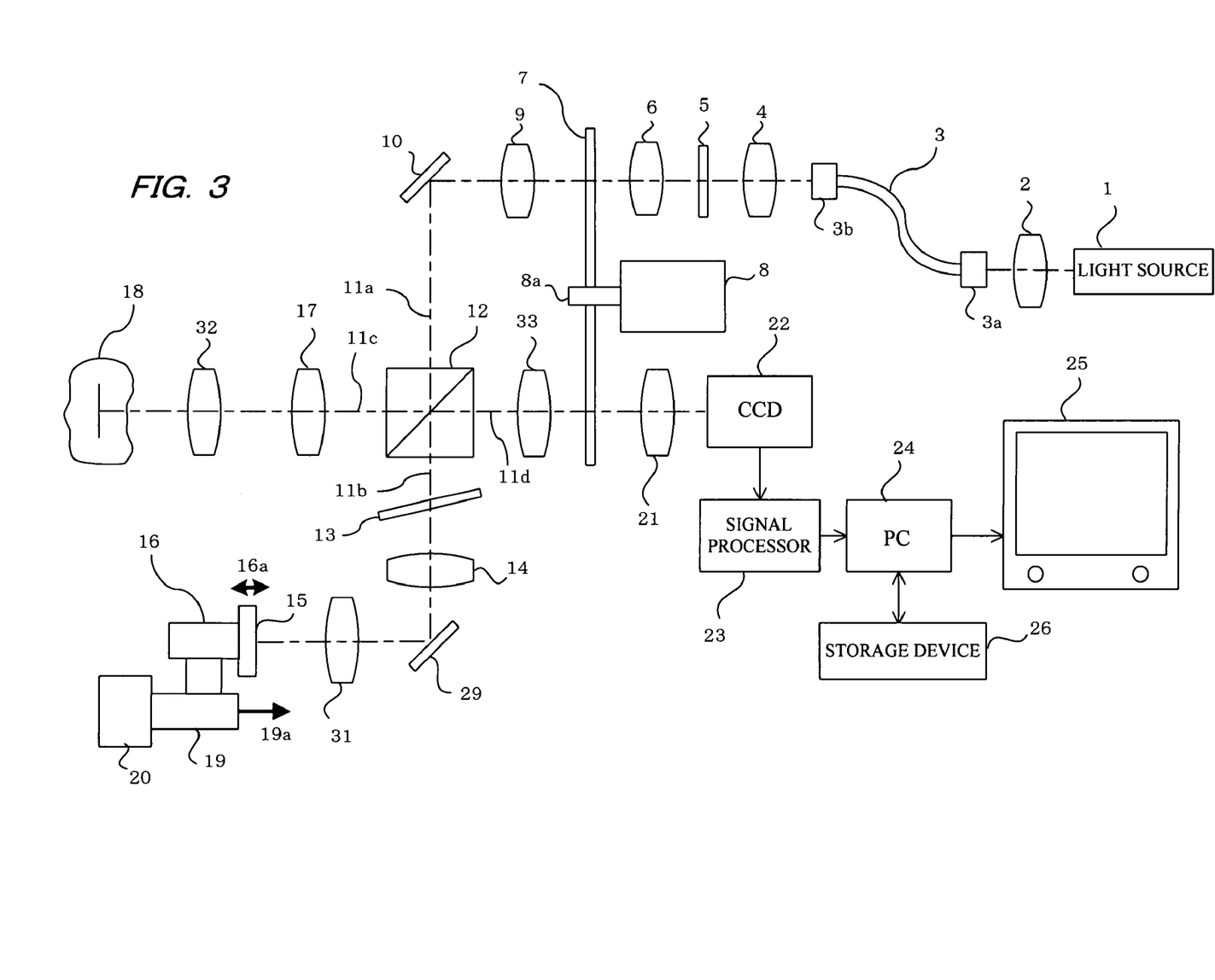
FIG. 3 is a block diagram showing an optical system in another embodiment of an optical object measurement apparatus according to the present invention.

FIG. 3 shows another embodiment of an optical object measurement apparatus of the present invention that differs from that of FIG. 1. Structural elements in FIG. 3 that are the same as those in FIG. 1 are indicated using the same reference symbols. The description below primarily focuses on points that differ from FIG. 1.

The light beam from a light source 1 used to observe tomographic images is transmitted via an optical fiber 3, and impinges on a surface of a Nipkow disk 7 via a lens 4, a stop 5, and a lens 6. The light beam that has passed through the Nipkow disk 7 is split in a beam splitter 12 into a reference optical path 11b and a probe optical path 11c. The light beam that travels along the reference optical path 11b is guided via an ND filter 13, a lens 14, a mirror 29 and a lens 31, and is then reflected by a mirror 15. The mirror 15 is mounted on a piezoelectric element 16, which performs periodic phase shifting of the reference light beam. A shutter not shown in the drawing is provided in the reference optical path near the mirror 15. The shutter can be used to block the optical path of the reference light beam as necessary and provide a typical reflection image that differs from the interference image.

The light beam that travels along the probe optical path 11c passes through lenses 17, 32, and subsequently enters the measurement object 18. In FIG. 3, the lenses (17, 32) disposed on the optical path 11c of the probe light beam and the lenses (14, 31) disposed on the optical path 11b of the reference light beam are designed so that they have identical characteristics and are symmetrically disposed with their optical path lengths being set to be the same in order to make highly accurate interference measurements. The piezoelectric element 16 to which the mirror 15 is affixed is connected to a stage 19, as is different from in FIG. 1, and is able to move in the optical axis direction (direction shown by arrow 19a) along the reference optical path 11b using a motor 20. The movement of the stage 19 in the optical axis direction changes the reference optical path length to form three-dimensional tomographic image information of the measurement object 18.

The light beam reflected from the measurement object 18 mixes in the beam splitter 12 with the reference light beam that has passed through the reference optical path, and generate an interference light beam. The interference light beam forms an image on a predetermined area of the Nipkow disk 7 via a lens 33. The interference light beam (detection light beam) that has passed through the pinholes on the Nipkow disk forms an image on the CCD or other two-dimensional image-capturing device 22. The video signal output from the image-capturing device 22 is subjected to predetermined processing via the signal processor 23 to extract a predetermined tomographic image on the basis of a computation process between frames, as has already been described. The tomographic image obtained after having been processed by the PC 24 is also displayed on a liquid crystal television monitor 25 and, if necessary, is stored in a storage device 26.

Figure 4:
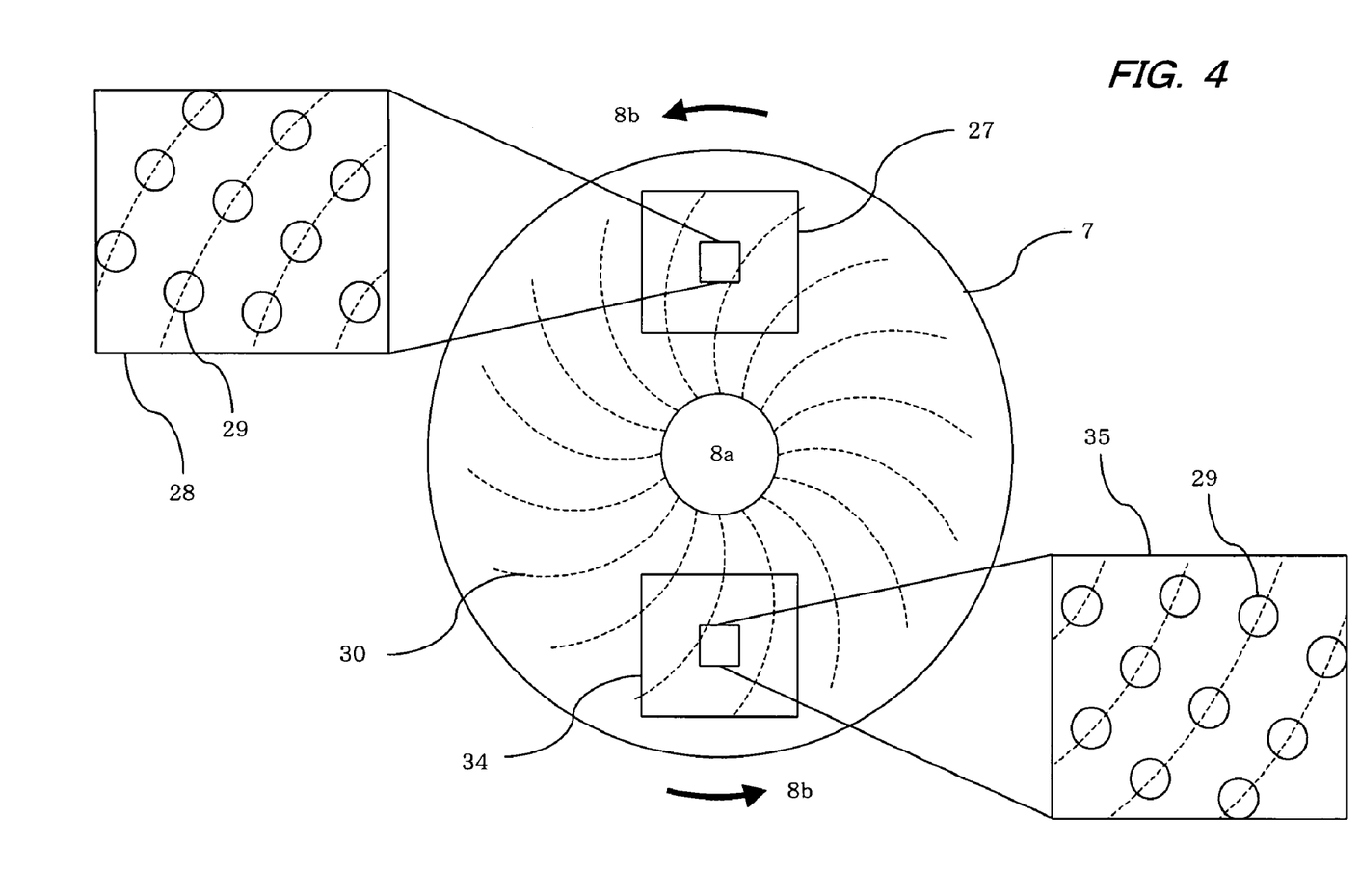
FIG. 4 is an illustrative view showing the configuration of a Nipkow disk used in FIG. 3.

FIG. 4 is an illustrative view showing the structure of the Nipkow disk used in the system shown in FIG. 3. The Nipkow disk 7 rotates at a predetermined speed around the rotating shaft 8a of the motor 8. In FIG. 4, it is assumed that a region 27 shows an area through which the light beam passes and which corresponds to a region on the light projecting side. Then, a region through which the light beam passes and which corresponds to a region on the detection side (light receiving side) is in a position 34. As is apparent from FIG. 4, the pinholes 29 on the Nipkow disk are symmetrically arranged on the light projecting and receiving sides, and the pinhole arrangement is designed so that symmetry will be maintained even while the disk rotates. The pinholes have a diameter of, e.g., 100 microns, and are spaced, e.g., approximately 500 microns apart. Holes can be worked to this degree of precision and size by being photo-etched or otherwise formed in a predetermined metal plate, as has already been described.

As is the same with the optical system shown in FIGS. 1 and 2, spatial coherence is improved in the optical system of FIG. 3 using the Nipkow disk shown in FIG. 4 because the light beam from the light source passes through the Nipkow disk 7. This allows the visibility of the interference fringes observed in the image-capturing device 22 to be improved, presenting an advantage in that interference signals can be more clearly detected and tomographic image information can be more effectively extracted.

As is also apparent from FIG. 4, in the optical system of FIG. 3, the position 27 on the Nipkow disk 7 through which the light beam passes via the lens 6 and other elements on the projection side is different from the position 34 through which the interference light beam passes via the lens 33 on the detection side, and both the positions 27 and 34 are arranged very precisely in a symmetric relationship on the disk. The fact that the detection light passes through the Nipkow disk via pinholes different from those on the projection side is important insofar as reflected light (scattered light) on the projection side of the disk will produce no adverse effect and the detection light can be captured without the reflected light (scattered light) by the two-dimensional image-capturing device 22 used as a light-receiving device.

In the system of FIGS. 3 and 4, the light beam is projected through the pinholes, and the detection light beam is received via the pinholes. Accordingly, all effects of optical noise are eliminated by the confocal effect, thereby improving the gradation and SN ratio of the detected signal. The configurations shown in FIGS. 3 and 4 thus make it possible to improve contrast in detected interference fringe signals and provide high-resolution tomographic images.

Figure 5A:
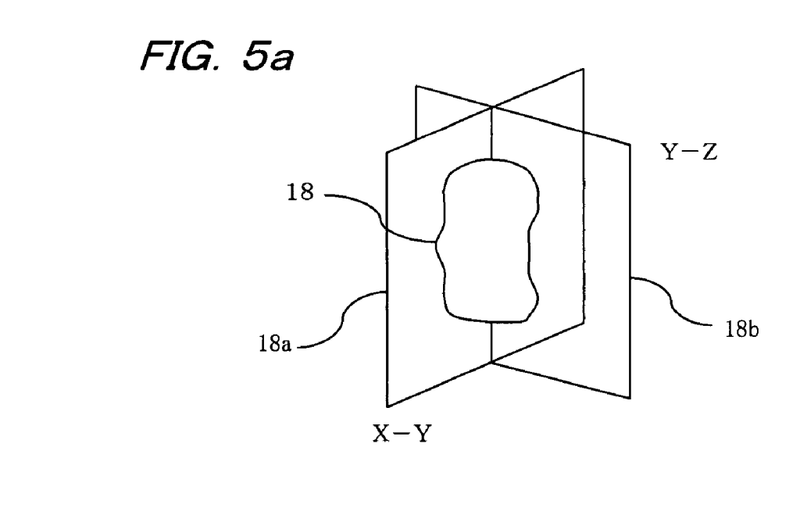
FIG. 5a is an illustrative view showing a coordinate system that can be applied for an object to be measured.
Figure 5B:
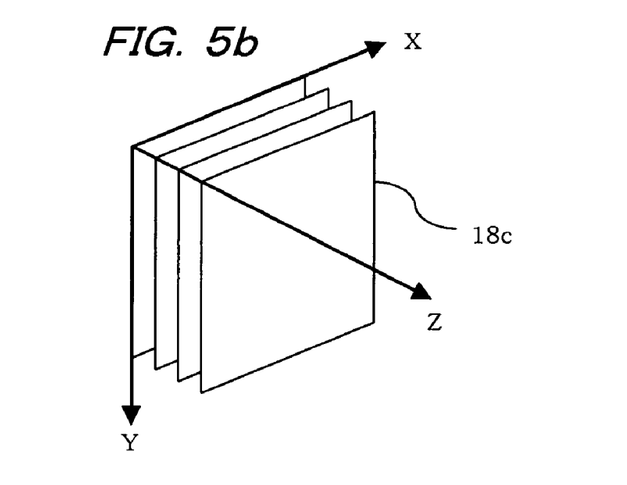
FIG. 5b is an illustrative view showing a plurality of X-Y images sampled in the direction of the Z-axis.

FIG. 5a through FIG. 5d show illustrative views in which the object to be measured may be any desired object. FIG. 5a shows a coordinate system that can be presumed in regard to the object. As shown in FIG. 5a, it is possible to consider an X-Y image 18a in a direction orthogonal to the optic axis of the optical system, and a Y-Z image 18b that follows the optic axis of the optical system (or an X-Z image not shown in FIG. 5a) in the optical object measurement apparatus of the present invention. In the optical system of the present invention as shown in FIG. 1 or 3, the image signal obtained using the image-capturing device 22 and the signal processor 23 shows an X-Y image that is detected as a cross-sectional image in the direction orthogonal to the optic axis. Therefore, when a plurality of X-Y images 18c is sampled as shown in FIG. 5b in the direction of the Z-axis according to movement of the measurement object 18 or the reference mirror 15, three-dimensional information of the interior of the object can be obtained.

Figure 5C:
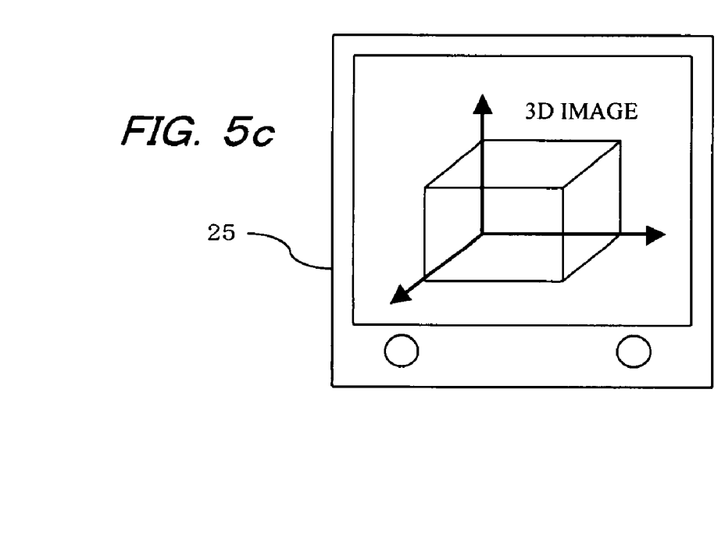
FIG. 5c is an illustrative view showing an example of a three-dimensional image of an object to be measured.
Figure 5D:
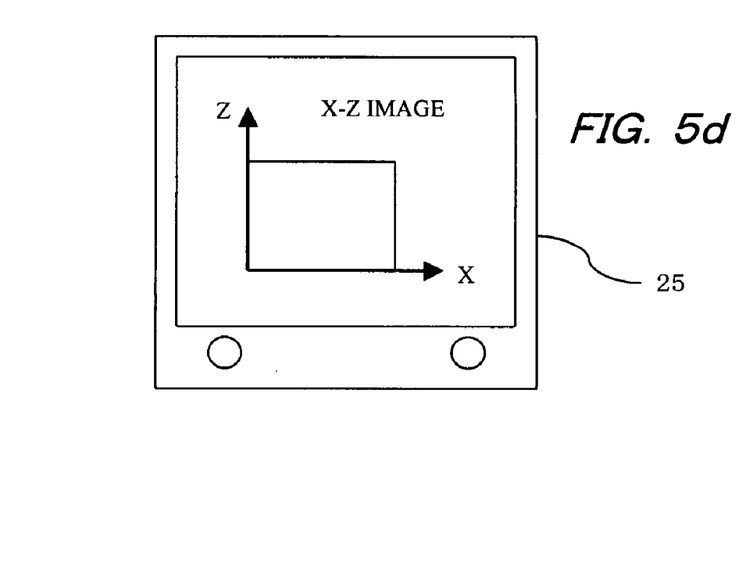
FIG. 5d is an illustrative view showing a cross-sectional image in the X-Z direction of the object to be measured.

FIG. 5c is a diagram showing an example of a case when three-dimensional information of the interior of the object has been extracted, subsequently subjected to various types of software-driven image processes via the PC 24 (refer to FIGS. 1 and 3), processed in a displayable form, and displayed on a monitor screen of the display device 25. FIG. 5d is a diagram showing an example of a case when the image data extracted in the model shown in FIG. 5b has been subjected to additional image processing to display a cross-sectional image in the X-Z direction of the object. The variety of optical tomography measurements described above are of profound use in, e.g., the fields of medicine or biology, for observing living tissue or performing cytoscopies, and in industrial fields, for making precision observations of microscopic industrial components.

What is claimed is:

1. An optical object measurement apparatus in which a predetermined area of an object to be measured is irradiated with a light beam from a light source, and optical interference is used to detect light reflected from the object in order to derive therefrom tomographic information of the object, the apparatus comprising:

a light source for generating a low-coherent light beam;

pinhole means disposed in a plane through which the light beam passes for sweeping the light beam from the light source;

a beam splitting element for splitting the light beam that has passed through the pinhole means into a probe light beam directed toward the object and a reference light beam directed toward a reference optical path;

light modulating means for modulating the reference light beam such that the phase thereof periodically shifts in the reference optical path;

two-dimensional image-capturing means for detecting an interference light beam that is produced by interference between the probe light beam from the object that has been guided via the beam splitting element and the reference light beam that has been modulated by the light modulating means; and signal processing means for processing a video signal from the two-dimensional image-capturing means to extract phase information of the interference light beam dependent on light modulation by the light modulation means and derive therefrom reflection intensity information of an interior of the object, wherein the phase shifting of the reference light beam performed by the light modulating means is periodically performed in accordance with the frame rate of the two-dimensional image-capturing means.

2. An optical object measurement apparatus according to claim 1, wherein the video signal output from the two-dimensional image-capturing means is processed between a plurality of frame images thereof to remove a direct-current component contained therein, and the phase information of the interference light beam that is dependent on light modulation by the light modulating means is processed to derive tomographic image information of the object.

3. An optical object measurement apparatus according to claim 1, wherein the pinhole means comprises a Nipkow disk that rotates around a predetermined axis and has a plurality of pinholes disposed in a predetermined array.

4. An optical object measurement apparatus according to claim 1, wherein the optical path length of either of the probe light beam or the reference light beam is variably controlled, and three-dimensional tomographic information of the object to be measured can be obtained in accordance with the variable control of the optical path length.

* * * * *